(12) United States Patent
Henocq et al.

(10) Patent No.: US 8,542,735 B2
(45) Date of Patent: Sep. 24, 2013

(54) METHOD AND DEVICE FOR CODING A SCALABLE VIDEO STREAM, A DATA STREAM, AND AN ASSOCIATED DECODING METHOD AND DEVICE

(75) Inventors: Xavier Henocq, Melesse (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 974 days.

(21) Appl. No.: 12/158,245

(22) PCT Filed: Dec. 19, 2006

(86) PCT No.: PCT/IB2006/004091
§ 371 (c)(1),
(2), (4) Date: Oct. 31, 2008

(87) PCT Pub. No.: WO2007/072228
PCT Pub. Date: Jun. 28, 2007

(65) Prior Publication Data
US 2009/0122865 A1 May 14, 2009

(30) Foreign Application Priority Data
Dec. 20, 2005 (FR) ...................................... 05 12972

(51) Int. Cl.
*H04N 7/12* (2006.01)
(52) U.S. Cl.
USPC .............. 375/240.12; 375/240.1; 375/240.15; 375/240.23; 375/240.24; 382/232; 382/236; 382/238

(58) Field of Classification Search
USPC ............... 375/240.1, 240.12, 240.15, 240.23, 375/240.24; 382/232, 236, 238
See application file for complete search history.

(56) References Cited

U.S. PATENT DOCUMENTS 6,072,831 A * 6/2000 Chen ......................... 375/240.03
6,639,943 B1 * 10/2003 Radha et al. ............. 375/240.11
(Continued)

FOREIGN PATENT DOCUMENTS
WO WO 02/05563 A1 1/2002
WO WO 03/063495 A2 7/2003

OTHER PUBLICATIONS

Reichel, J. et al., "Joint Scalable Video Model JSVM-3", Joint Video Team (JVT) of ISO/IEC MPEG & ITU-T VCEG (ISO/IEC JTC1/SC29/WG11 and ITU-T SG16 Q.6), pp. 1-34, Jul. 29, 2005.

(Continued)

Primary Examiner — Nathan Flynn
Assistant Examiner — Sarah Su
(74) Attorney, Agent, or Firm — Fitzpatrick, Cella, Harper & Scinto

(57) ABSTRACT

A video sequence is coded in the form of a base level and an refinement level. A group of pictures of the base level comprises intra coded or mono-predicted end images (I,P) and bi-predicted images (B1, B2, B3), the refinement level comprises at least one image (E2, E4, . . . , E16) with no temporal correspondent in the base level. Use is made of predictive coding of said image with no temporal correspondent (E2, E4, . . . , E16) by making reference to a plurality of images, each image of said plurality being an image of the refinement level with no temporal correspondent in the base level (E4, E8, E12, E14) or an image of the refinement level (E1, E17) corresponding temporally to an end image (I1P).

36 Claims, 13 Drawing Sheets

(56) References Cited

U.S. PATENT DOCUMENTS

| | | |
|---|---|---|
| 7,113,643 B2 | 9/2006 | Le Leannec et al. .......... 382/235 |
| 7,190,838 B2 | 3/2007 | Le Leannec et al. .......... 382/233 |
| 7,215,819 B2 | 5/2007 | Onno et al. .................... 382/240 |
| 7,281,033 B2 | 10/2007 | Le Leannec et al. .......... 709/217 |
| 2002/0071485 A1* | 6/2002 | Caglar et al. ............. 375/240.01 |
| 2002/0150158 A1* | 10/2002 | Wu et al. .................. 375/240.12 |
| 2003/0133502 A1* | 7/2003 | Yagasaki et al. .......... 375/240.13 |
| 2004/0006644 A1 | 1/2004 | Henocq et al. ................ 709/246 |
| 2004/0042486 A1 | 3/2004 | Onno et al. .................... 370/466 |
| 2004/0068587 A1 | 4/2004 | Le Leannec et al. .......... 709/247 |
| 2004/0184529 A1 | 9/2004 | Henocq et al. ........... 375/240.01 |
| 2005/0089105 A1* | 4/2005 | Zhang et al. ............. 375/240.27 |
| 2005/0163211 A1* | 7/2005 | Shanableh ................ 375/240.1 |
| 2005/0195900 A1* | 9/2005 | Han .......................... 375/240.21 |
| 2006/0072661 A1* | 4/2006 | Kim et al. ................. 375/240.08 |
| 2006/0165302 A1* | 7/2006 | Han et al. .................... 382/240 |
| 2006/0182179 A1* | 8/2006 | Han .......................... 375/240.16 |
| 2007/0019721 A1 | 1/2007 | Le Leannec et al. ....... 375/240.1 |
| 2007/0127576 A1 | 6/2007 | Henocq et al. ........... 375/240.16 |
| 2007/0160137 A1* | 7/2007 | Guo et al. ................. 375/240.1 |
| 2007/0195880 A1 | 8/2007 | Henocq et al. ........... 375/240.13 |
| 2007/0216699 A1 | 9/2007 | Le Leannec et al. .......... 345/555 |
| 2007/0223033 A1 | 9/2007 | Onno et al. .................... 358/1.15 |
| 2007/0230566 A1* | 10/2007 | Eleftheriadis et al. ..... 375/240.1 |
| 2007/0286508 A1 | 12/2007 | Le Leannec et al. .......... 382/240 |
| 2008/0025399 A1 | 1/2008 | Le Leannec et al. .... 375/240.16 |
| 2008/0075170 A1 | 3/2008 | Henocq et al. ........... 375/240.16 |
| 2008/0095231 A1 | 4/2008 | Onno et al. ............... 375/240.12 |
| 2008/0130736 A1 | 6/2008 | Onno et al. ............... 375/240.01 |
| 2008/0131011 A1 | 6/2008 | Le Leannec et al. .......... 382/238 |
| 2008/0144725 A1 | 6/2008 | Henocq et al. ........... 375/240.27 |
| 2008/0232470 A1* | 9/2008 | Park et al. ................. 375/240.12 |
| 2009/0067496 A1* | 3/2009 | Ying et al. ............... 375/240.15 |
| 2009/0138773 A1* | 5/2009 | Henocq et al. ............... 714/746 |
| 2010/0008419 A1* | 1/2010 | Wu et al. .................. 375/240.15 |
| 2010/0150232 A1* | 6/2010 | Nguyen et al. ........... 375/240.12 |
| 2011/0298974 A1* | 12/2011 | Garrido et al. ................. 348/441 |
| 2011/0310217 A1* | 12/2011 | Lee et al. .................... 348/14.08 |
| 2012/0063516 A1* | 3/2012 | Kwon et al. ............. 375/240.16 |

OTHER PUBLICATIONS

Verdicchio F., et al., "Error-Resilient Video Coding Using Motion Compensated Temporal Filtering and Embedded Multiple Description Scalar Quantizers", Image Processing, 2005, IEEE International Conference on Genova, Italy, pp. 932-935, Sep. 11, 2005.

Mys, S., "Scalable Video Coding in Error Prone Networks", Sixth FirW PhD Symposium, Faculty of Engineering, Ghent University, paper nr. 117, Nov. 30, 2005.

Sullivan, G., et al., "Text of ISO/IEC 14496-10 Advanced Video Coding 3rd Edition", ISO/IEC JTC 1/SC29/WG11, N6540, Jul. 2004.

Lee, K., et al., "Virtual Base-layer Motion for Scalable Video Coding", ISO/IEC JTC1/SC29/WG11, 71$^{st}$ MEPE meeting, M11595, Hong Kong, Jan. 2005.

* cited by examiner $$h[k] = s[2k+1] - P(s[2k]) \quad (2.1)$$

$$P_{5/3}(s[x, 2k]) = \tfrac{1}{2} s[x+m_1, 2k] + \tfrac{1}{2} s[x+m_1, 2k+2] \quad (2.2)$$

$$l[k] = s[2k] + U(h[k]) \quad (2.3)$$

$$U_{5/3}(h[x, k]) = \tfrac{1}{4} h[x+m_2, k] + \tfrac{1}{4} h[x+m_2, k-1] \quad (2.4)$$

METHOD AND DEVICE FOR CODING A SCALABLE VIDEO STREAM, A DATA STREAM, AND AN ASSOCIATED DECODING METHOD AND DEVICE

The present invention concerns a method and a device for coding a scalable video stream, as well as an associated decoding method and device.

It belongs to the field of video transmission over a network.

The development of mobile and fixed communication networks should enable numerous video transmission applications to appear. These applications will however only spread if their quality is acceptable for the user. Yet the increase in the traffic on the networks gives rise in parallel to an increase in transmission errors, which are due either to congestion of the network (due to an overload thereof), or to interference which perturbs transmission. In practice, these errors may be bit errors, or even losses of transmission packets.

When a transmission error occurs, certain applications may allow re-transmission of the erroneous data. With regard to real-time applications, such as video communication, these are in general to constrained by time to accept re-transmissions. It is then necessary to take measures to render the bitstream more robust a priori, i.e. before the transmission of the data.

The concern here is in particular to render more robust streams of type MPEG-4 part 10 amendment 1, also termed SVC (Scalable Video Coding). This type of format, certain aspects of which are still in course of standardization, enables the generation of videos that can be finely decomposed into different levels, making it possible to finely adapt to the transmission conditions.

Thus, by way of an example that is in no way limiting, the invention concerns domestic applications of transmission from a sender to a receiver. The sending and receiving units will be potentially mobile embedded systems. The sending unit will have storage capacities which will enable it to store videos after their acquisition and their compression and real-time coding capacities.

A user will be able to request the viewing of videos on a viewing receiving unit. For this, a connection will be created between the sender and the receiver. A first exchange of items of information between the sender and the receiver will enable the sender to know the nature of the receiver, its capacities and the wishes of the user. It will be possible for these first items of information to describe the receiver in terms of overall calculation capacity, decoding capacity and display capacity. Other items of information will be exchanged during the transmission.

By contrast to items of information transmitted on initialization, these items of information will be updated regularly. They will describe the evolution of the capacities of the receiver both in terms of reception and in terms of real calculation capacity. It will be possible for the analysis of these items of information to incite the sender to adapt the video.

The adaptation of the video is only efficacious in case of a steady state. It does not enable periods of transition between two states to be dealt with. When for example the calculation capacities decrease, there is a risk of losses occurring while the sender has not been alerted of the change.

The invention provided is directed to anticipation with respect to possible data losses. The conventional coding method proposed in the SVC standard will be modified in order to limit propagations of errors between images.

A rapid description is given below of the SVC standard, which is defined in part 10, amendment 1 of the MPEG-4 standard. For a more in-depth description, reference may usefully be made to the document by J. REICHEL, H. SCHWARTZ and M. WIEN entitled "*Joint Scalable Video Model JSVM-3*", Poznan, July 2005. As from a few months ago, the SVC standard has been treated as an extension of the H264 standard, of which a description may be found in the document by G. SULLIVAN, T. WIEGAND, D. MARPE and A. LUTHRA entitled "*Text of ISO/IEC* 14496-10 *Advanced Video Coding*", $3^{rd}$ edition. The SVC standard completes the H264 standard by introducing scalability, spatial, temporal and quality coding tools. These levels of scalability will be overlapped in the same stream, the basic level being in general compatible with the H264 standard (and thus in general coded in closed loop in accordance with the distinction described below).

Two technologies are envisaged for the coding of the SVC streams, each technology using blocks of pixels as basic units for coding: open-loop coding and closed-loop coding.

The technique of open-loop coding is based on Motion Compensated Temporal Filtering or MCTF.

Coding in open loop means that it is the images of the original sequence that are used as references for the motion prediction in the coder. This technique is illustrated in the flowchart of FIG. 1.

It commences at step S100 with the creation of a group of successive images (Group of pictures, GOP). These groups may be of variable sizes. This step is followed by the step S101 during which a motion estimation is carried out. This is followed by motion compensated temporal filtering (steps S103, S105) based on a lifting scheme illustrated in FIG. 2.

This filtering commences with a polyphase transform represented by steps S201, S203*a* and S203*b*. These steps separate the even $S_{2k}$ and odd $S_{2k+1}$ samples (pixels). These steps are followed by the step S205 which consists of carrying out the prediction of the odd samples by the even samples. This prediction is represented by the equation (2.2), in which s[x, k] is the sample at the spatial position x in the image k of the GOP and $m_1$ and $m_2$ are the motion vectors obtained during motion estimation step S101 of FIG. 1. Step S205 is followed by step S207 during which the prediction of the even sample is subtracted from the value of that sample (equation (2.1), in which P designates the prediction). Note that the samples coming from that step are high frequency samples. Step S207 is followed by step S209 during which updating of the even samples is carried out. For this, equation (2.4) is applied to the high frequency samples coming from step S207. The result is added to the even samples at step S211 (equation (2.3)). Note that the samples obtained at step S211 are low frequency samples.

With reference to FIG. 1, the SVC coding continues with step S107 during which a spatial transformation of the integer Discrete Cosine Transform (DCT) type is applied to the high frequency images. This step is followed by the test step S109 which consists of testing the number of low frequency images remaining.

If this number is different from 1, step S101 is returned to process the remaining low frequency images. This step is followed by the steps S103, S105 and S107 described earlier. If only one low frequency image remains, the spatial transform is applied to all the remaining images (low and high frequency) and the coding ends at step S1 before passing onto the following GOP.

It is to be noted that in open-loop coding, the decoder will not have the same reference images as the coder during the motion compensation.

The technique of closed-loop coding is illustrated in the flowchart of FIG. 3. In video, the term closed-loop coding is used for a coding system in which the images used as references for the motion prediction are coded and decoded images. Thus, it will be possible for the decoder to have the same reference as the coder. Closed-loop coding of the SVC standard uses a transformation of the GOP into so-called B-hierarchical images, well known to the person skilled in the art.

As FIG. 3 shows, commencement is made by creating a GOP of $N=2^{n-1}$ images (step S301). This step is followed by the step S303 consisting of classifying the images into n hierarchical levels. During this step, the first image of the GOP is allocated to hierarchical level 1. The hierarchy is then climbed by multiplying the time frequency of the images (i.e. the number of frames per time interval) by two at each hierarchical level, each image of a hierarchical level x being of equal distance from the two images closest to the level x−1.

Step S303 is followed by step S305 during which an integer variable k is initialized to the value 1. Next it is verified that k has not reached the number of hierarchical levels n (test S307). If that is not the case, the motion estimation/motion compensation is carried out for each image of the level k (step S309). When k=1, the second image of the level is predicted from the first image of that level. When k is greater than 1, each image of the level is predicted from the two images bounding it taken from the level k−1. Step S309 is followed by step S311 which consists of performing the calculation of the residue (difference between the original image and its prediction), then the step S313 which consists of applying a spatial transformation of DCT type to each block of pixels of the residual image. This step is followed by the step S315 which consists of incrementing k by 1.

Step S307 is followed by end step S317 if k reaches n. More particularly the coding algorithm stops at this step and passes on to the coding of the following GOP.

The SVC standard has been defined to code a video stream in the form of several hierarchical levels. In general, the base level of the SVC stream is coded in closed loop in order to remain compatible with the H264 standard. As regards refinement levels, these are either coded in open loop, or are coded in closed loop like the base level. The refinement levels may increase the time frequency, the spatial resolution and the quality of the base levels. In order not to encumber the explanation, the quality refinement levels will not be mentioned in what follows, but naturally they could be used in the context of the invention.

In order to increase performance with respect to compression, the SVC standard provides for predicting a spatial hierarchical level k from a spatial level of lower hierarchy. It will thus be possible to predict the texture and motion of a level k from information from a lower level. The terms inter-layer texture prediction and inter-layer motion prediction are used.

In order to increase the improvement in compression, a recent contribution to the standard has proposed a scheme enabling inter-layer prediction when the levels have different time frequencies. Indeed, in this case, it is possible for the images of a hierarchical level k not to have a correspondent having the same temporal reference in the lower level. When this is the case, a virtual image is created on the basis of the images present in the lower level. The images of the level k not having a corresponding image are then predicted on the basis of the virtual images.

FIGS. 4 and 5 represent two SVC streams constituted by two levels of spatio-temporal hierarchy. In both cases, the base level is coded with hierarchical B images (denoted "B" in FIGS. 4 and 5). The refinement level doubles the spatial resolution and the time frequency. In FIG. 4, the refinement level is coded in open loop with motion compensated temporal filtering (MCTF) with updating step. Incidentally, it may be recalled that three types of video images are defined by the MPEG standard: intra images (I type), not having any reference in a preceding or following image; images obtained by forwards prediction (P type), coded with respect to a preceding reference image; and bi-predicted images (B type), coded with respect to a preceding reference image and a following reference image.

In FIG. 4, the images L3, H3, H2, H1 and H0 as well as the images Bx (x=1, 2, 3) are images coded in the SVC bitstream. The images L0, L1 and L2 are generated during the coding but are not kept in the final bitstream. The images represented in dashed lines in the Figure are thus not coded.

FIG. 5 represents a refinement level coded with hierarchical B images. The images E1 to E17 and 1, P, B1, B2 and B3 are all kept in the final bitstream. The virtual images are illustrated in dashed line and are not coded.

In the two Figures, the arrows represent the direction of prediction. For example, in FIG. 4, image 1 is predicted from images 2, 3 and 4. Image 6 is updated by virtue of images 1, 2 and 5. Image B1 is predicted from images I and P, etc.

In the coding systems of this type, which are, as has been seen, based on a high number of prediction modes, high dependencies exist between the images for the benefit of the compression performances which form the main object of the developments to these systems. Those high dependencies may however become very detrimental for practical applications of video transmission.

This is because the more the dependencies are increased, the more the fragility of the stream is increased. The loss of the data corresponding to an image during the transmission over a channel suffering losses may then result in the loss of numerous images in the base level as in the refinement level. For example, in the case illustrated in FIG. 5, the loss of the bi-predicted image B1 in the base level induces, due to the dependencies, the loss of six other images in the base level and fifteen images in the refinement level.

Few schemes have been proposed in the literature to increase the robustness to packet losses of the video streams of SVC type. Recently, the article "*Error resilient video coding using motion compensated temporal filtering and embedded multiple description scalar quantizers*" by F. Verdicchio, A. Munteanu, A. Gavrilescu, J. Cornalis and P. Schelkens (ICIP 2005), proposes to add a step of coding by multiple descriptions further to the coding by MCTF in SVC. Two descriptions of each image are generated by a quantization of MDSQ (Multiple Description Scalar Quantization) type. The two descriptions are redundant, each transporting information relative to the other description. Thus if one of the descriptions is lost, it will be possible for it to be approximated by the other description. This scheme is however complex and has rather low performance in terms of compression. This is because this scheme adds a supplementary step during the coding and the decoding, and deliberately leaves redundancy in the bitstream, which increases the bit rate.

The invention is on the contrary directed to a coding scheme which makes it possible to increase the robustness to errors by limiting the propagation of errors, without however compromising the compression performance or increasing the complexity overall.

The invention thus provides a method of coding a video sequence in the form of a base level and an refinement level, a group of pictures of the base level comprising intra or mono-predicted end images and bi-predicted images, the refinement level comprising at least one image with no temporal correspondent in the base level, characterized by a step of predictive coding of said image with no temporal correspondent by making reference to a plurality of images, each image of said plurality being an image of the refinement level with no temporal correspondent in the base level or an image of the refinement level corresponding temporally to an end image.

A particular organization of the coding is thus provided by virtue of which losses of data or errors in the bi-predicted images of the base stream will have no consequence on the images of the refinement stream which do not have a temporal correspondent in the base level.

It may be noted that this solution does not require the use of virtual images which increase the dependencies between images without however providing a significant improvement in compression.

There may be provided a step of coding at least one image of the refinement level temporally corresponding to an image of the base level by making reference to the latter for example in order to improve the compression.

There can also be provided a step of coding at least one image of the refinement level temporally corresponding to an image of the base level by making reference to at least one image with no temporal correspondent in the base level. This solution further limits the dependencies between the refinement level and base level, and consequently the consequences of losses of data in the base level.

The coding of said image of the refinement level temporally corresponding to an end image may be performed with reference to the latter.

It is possible furthermore to implement a step of determining as an anchoring image an image of the refinement level with no temporal correspondent in the base level and temporally neighboring an image of the base level that is bi-predicted with reference to the end images.

This anchoring image may thus play the role of a central image (of the type of a B1 bi-predicted image) without however depending on the base level.

The determining step may comprise a step of selecting the image optimizing a rate-distortion criterion from the images of the refinement level with no temporal correspondent in the base level and temporally neighboring the image of the base level bi-predicted with reference to the end images.

More particularly, it is thus possible to perform the coding of the images of the refinement level, with no temporal correspondent in the base level and situated temporally between the anchoring image and an end image, on the basis of the anchoring image and the image of the refinement level temporally corresponding to that end image.

According to a first embodiment, closed-loop coding is applied to the set formed by the images of the refinement level with no temporal correspondent in the base level and the images of the refinement level corresponding temporally to the end images.

The temporal prediction of an image of the refinement level with no temporal correspondent in the base level, by making reference to an image of the refinement level with no temporal correspondent in the base level and to an image of the refinement level corresponding temporally to an end image, may then comprise a step of calculating a weighted average of the two differences calculated with respect to the two reference images used, the weighting taking into account the temporal distances between the images.

Thus the fact that the images coded in closed loop are not temporally equally spaced is taken into account.

According to a second embodiment, open-loop coding using motion compensated temporal filtering is applied to the set formed by the images of the refinement level with no temporal correspondent in the base level and the images of the refinement level corresponding temporally to the end images.

The temporal filtering with reference to an image of the refinement level with no temporal correspondent in the base level and to an image of the refinement level corresponding temporally to an end image may then be weighted by the temporal distances separating the images, also here to take into account the fact the images considered are not necessarily temporally equally spaced.

The structure of the coding thus provided is coded in the video stream, for example by the indication of the images on the basis of which the image to decode is predicted. The decoding method used to decode the video stream will thus adopt the structure provided by the invention.

Thus the invention also provides a method of decoding a video sequence received in the form of a base level and an refinement level, a group of pictures of the base level comprising intra or mono-predicted end images and bi-predicted images, the refinement level comprising at least one image with no temporal correspondent in the base level, characterized by a step of predictive decoding of said image with no temporal correspondent by making reference to a plurality of images, each image of said plurality being an image of the refinement level with no temporal correspondent in the base level or an image of the refinement level corresponding temporally to an end image.

The invention also provides a method of transmitting a video sequence over a transmission channel, characterized in that it comprises the following steps:
  estimating the losses over the transmission channel;
  coding the video sequence using a coding method as presented above, in which the coding mode of a macroblock of an image having a temporal correspondent in the base level is determined according to the estimated losses;
  sending the coded sequence With the same object as that stated above, the present invention provides a device for coding a video sequence in the form of a base level and a refinement level, a group of pictures of the base level comprising intra or mono-predicted end images and bi-predicted images, the refinement level comprising at least one image with no temporal correspondent in the base level, characterized by means for predictive coding of said image with no temporal correspondent by making reference to a plurality of images configured such that each image of said plurality is an image of the refinement level with no temporal correspondent in the base level or an image of the refinement level corresponding temporally to an end image.

The invention also provides a device for transmitting a video sequence over a transmission channel, characterized in that it comprises means for estimating the losses over the transmission channel, a device for coding the video sequence as stated above, with means for determining the coding mode of a macroblock of an image having a temporal correspondent in the base level depending on the estimated losses and on the means for sending the coded sequence.

In a complementary manner, the invention provides a device for decoding a video sequence received in the form of a base level and an refinement level, a group of pictures of the base level comprising intra or mono-predicted end images and bi-predicted images, the refinement level comprising at least one image with no temporal correspondent in the base level, characterized by means for predictive decoding of said image with no temporal correspondent by making reference to a plurality of images configured such that each image of said plurality is an image of the refinement level with no temporal correspondent in the base level or an image of the refinement level corresponding temporally to an end image.

The invention further provides a data stream representing a video sequence in the form of a base level and an refinement level, a group of pictures of the base level comprising intra or mono-predicted end images and bi-predicted images, the refinement level comprising at least one image with no temporal correspondent in the base level, characterized in that said image with no temporal correspondent is coded predictively by making reference to, a plurality of images, each image of said plurality being an image of the refinement level with no temporal correspondent in the base level or an image of the refinement level corresponding temporally to an end image.

The present invention also concerns an information storage means which can be read by a computer or a microprocessor storing instructions of a computer program, making it possible to implement a method as above.

The present invention also concerns a partially or totally removable information storage means which can be read by a computer or a microprocessor storing instructions of a computer program, making it possible to implement a method as above.

The present invention also concerns a computer program product able to be loaded into a programmable apparatus, comprising sequences of instructions for implementing a method as above, when that program is loaded and executed by the programmable apparatus.

The invention also proposes a method of coding a video sequence in the form of a base level and an refinement level, a group of pictures of the base level comprising intra coded or mono-predicted end images and bi-predicted images, the refinement level comprising at least one B-hierarchical image with no temporal correspondent in the base level, characterized by a step of predictive coding of said B-hierarchical image with no temporal correspondent by making reference to at least one image of the refinement level with no temporal correspondent in the base level.

In particular, some B-hierarchical images with no temporal correspondent in the base layer are predictively coded with reference to two images of the refinement layer having no temporal correspondent in the base layer.

In a corresponding manner, the invention proposes a method of decoding a video sequence received in the form of a base level and an refinement level, a group of pictures of the base level comprising intra coded or mono-predicted end images and bi-predicted images, the refinement level comprising at least one B-hierarchical image with no temporal correspondent in the base level, characterized by a step of predictive decoding of said B-hierarchical image with no temporal correspondent by making reference to at least one image of the refinement level with no temporal correspondent in the base level.

Also proposed is therefore a device for coding a video sequence in the form of a base level and an refinement level, a group of pictures of the base level comprising intra coded or mono-predicted end images and bi-predicted images, the refinement level comprising at least one B-hierarchical image with no temporal correspondent in the base level, characterized by means for predictive coding of said B-hierarchical image with no temporal correspondent by making reference to at least one an image of the refinement level with no temporal correspondent in the base level, as well as a device for decoding a video sequence received in the form of a base level and an refinement level, a group of pictures of the base level comprising intra coded or mono-predicted end images and bi-predicted images, the refinement level comprising at least one B-hierarchical image with no temporal correspondent in the base level, characterized by means for predictive decoding of said B-hierarchical image with no temporal correspondent by making reference to at least one image of the refinement level with no temporal correspondent in the base level.

The invention also provides the resulting data stream.

As the particular features and advantages of the decoding method, of the coding and decoding devices, of the data stream, of the storage means and of the computer program product are similar to those of the method, they are not repeated here.

Other aspects and advantages of the invention will emerge from a reading of the following detailed description of a particular embodiment, given by way of non-limiting example. The description refers to the accompanying drawings, in which:

FIG. 1, already described, is a flow chart illustrating the main steps of an open loop coding scheme that is known per se;

FIG. 2, already described, is a diagrammatic representation of the step of motion compensated temporal filtering included in the coding scheme of FIG. 1;

FIG. 3, already described, is a flow chart illustrating the main steps of a closed-loop coding scheme that is known per se;

FIG. 4, already described, is a diagrammatic representation of an example of open-loop coding of a video stream according to the SVC standard, known per se;

FIG. 5, already described, is a diagrammatic representation of an example of closed-loop coding of a video stream according to the SVC standard, known per se;

An embodiment of the invention will now be described with respect to FIG. 6.

Figure 4:
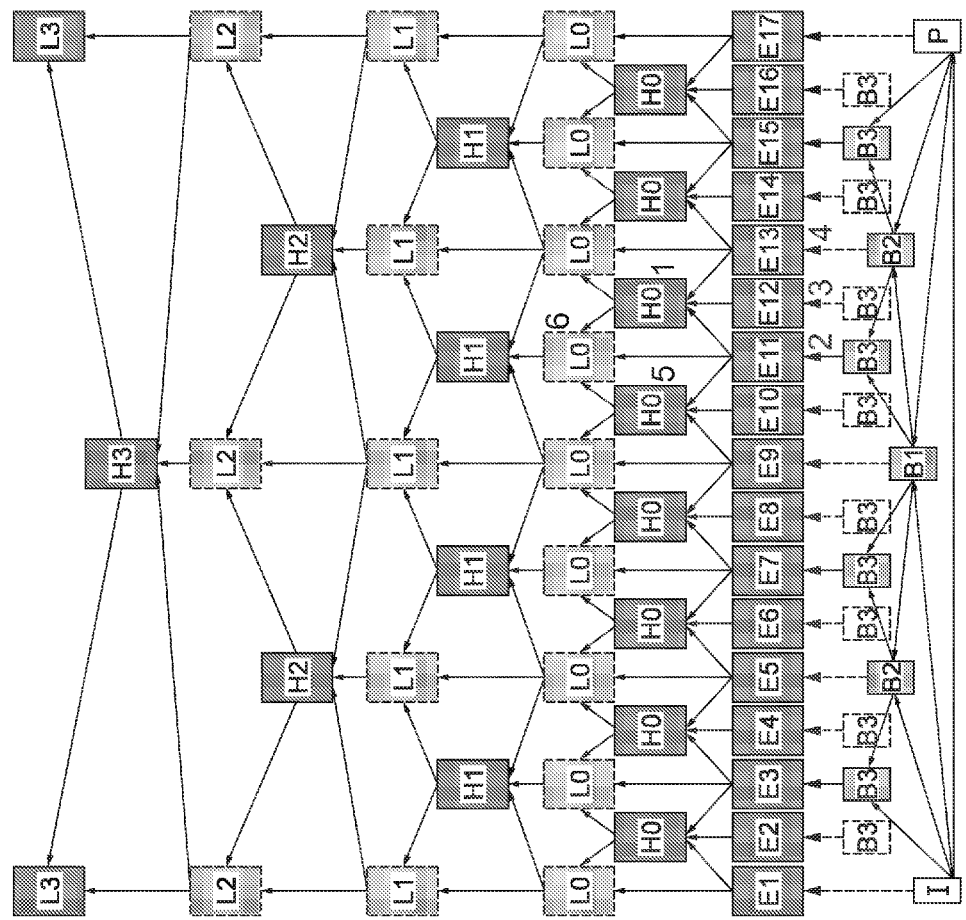
Figure 5:
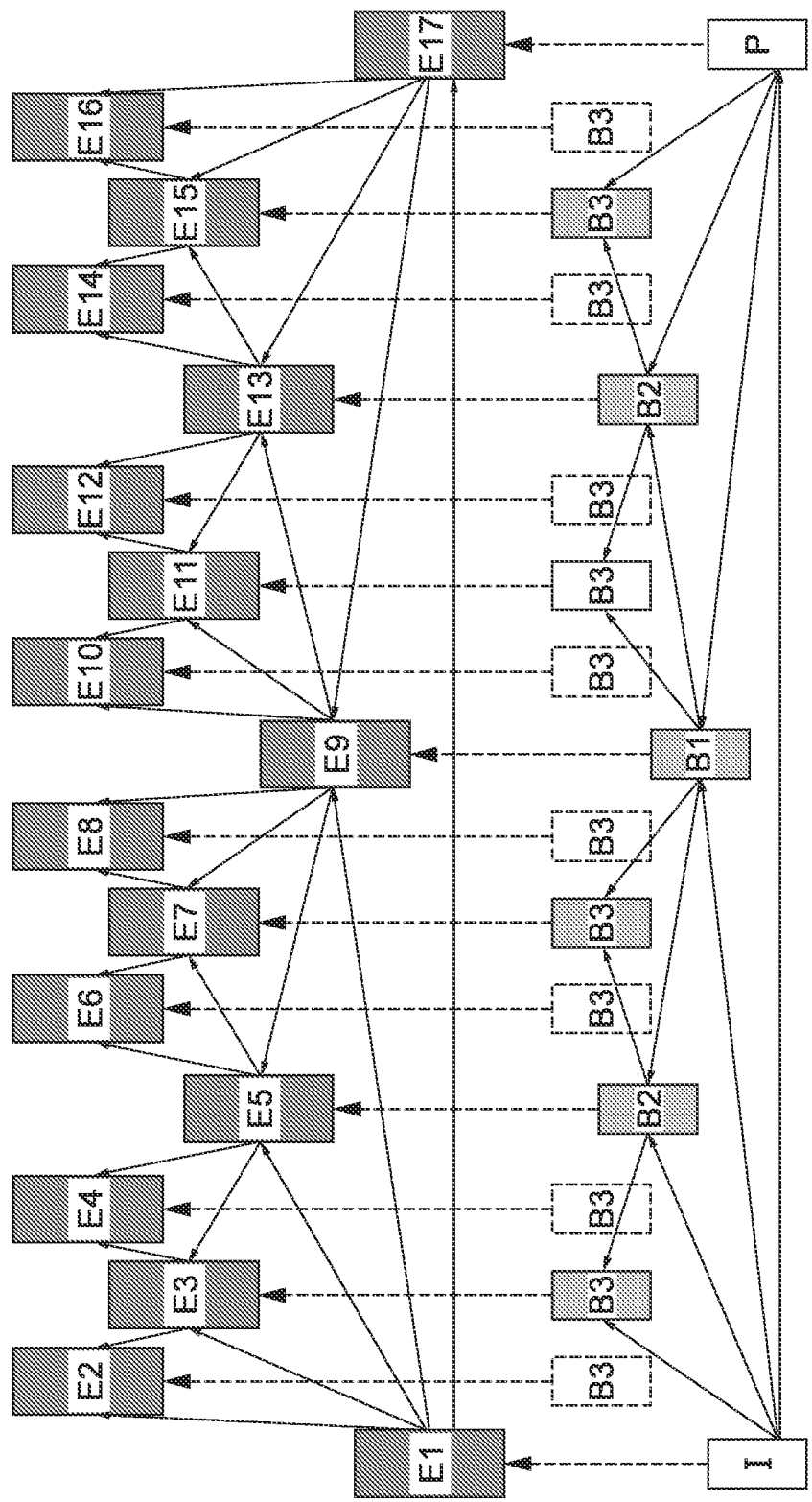

The coding commences by the definition of a GOP (Group of pictures) of N images (S1000). N may be arbitrary, in general even. In the example of FIGS. 4 and 5 already described, N=16. It may be noted that seventeen images are represented in the drawings, the last image being the first image of the following group, which is nevertheless useful for the prediction of the images of the current group.

At step S1002 the images which will serve for the coding of the base resolution level are created using that GOP. Those images are created for example by selecting one image out of two from the group of pictures and by spatially subsampling (for example with a ratio of two) in both dimensions of the selected images.

Step S1002 is followed by step S1004 in which the coding of the images of the base level defined at step S1002 are coded. In the example described here, these images are coded with hierarchical B frames according to the procedure described in FIG. 3. As a variant, it would be possible to code them by means of a transformation of MCTF type.

Once the images of the base level have been coded, the coding of the refinement level is commenced by step S1005, precisely by performing the coding of the first image of the group. If that image is the first coded image of the sequence, it will be coded in intra mode. Otherwise it will be coded in inter mode by taking the first image of the preceding group of pictures as reference. Moreover adaptive coding could be used which also makes reference to the corresponding image I in the base level.

Step S1006 which follows carries out the coding of the last image of the group, which is also the first image of the following group. That image is coded in inter mode by taking as reference the first image of the current group, here with adaptive coding which also makes reference to the corresponding image P in the base level.

Step S1008 is then proceeded to at which the value of the level of losses on the channel is tested. If the latter is less than a given threshold, it is possible at step S1014 to carry out the coding of the refinement level by using the techniques used conventionally in SVC and already described with reference to FIGS. 1 to 5.

The adaptation of the coding to the state of the channel enabled by these steps is however optional and in a variant it would be possible to pass from step S1006 to step S1010, now described, without any test.

If at step S1008, the level of losses exceeds the threshold, the steps of coding the refinement level in accordance with the invention are proceeded to: the coding occurs in two steps depending on whether or not the image to be coded has a temporal correspondent in the base level Thus, step S1010 carries out the coding of the images not having a temporal correspondent in the base level, that is to say the images of the refinement level which participate in increasing the temporal resolution.

In the example described here a particular procedure of hierarchical B coding is used. This procedure commences with the definition of an anchoring image (step S1100 of FIG. 7).

The anchoring image is defined as being an image of a group of pictures not having a correspondent in the base level and having a central position. The most central image of the group being an image having a temporal correspondent in the base level (here the image B1), one of the two images preceding or following the most central image is defined here as anchoring image. The choice of the anchoring image from these two images could be made at random, or by choosing the image which will optimize a rate-distortion criterion. The anchoring image is thus immediately temporally neighboring to the most central image of the group of pictures, here image B1.

Figure 1:
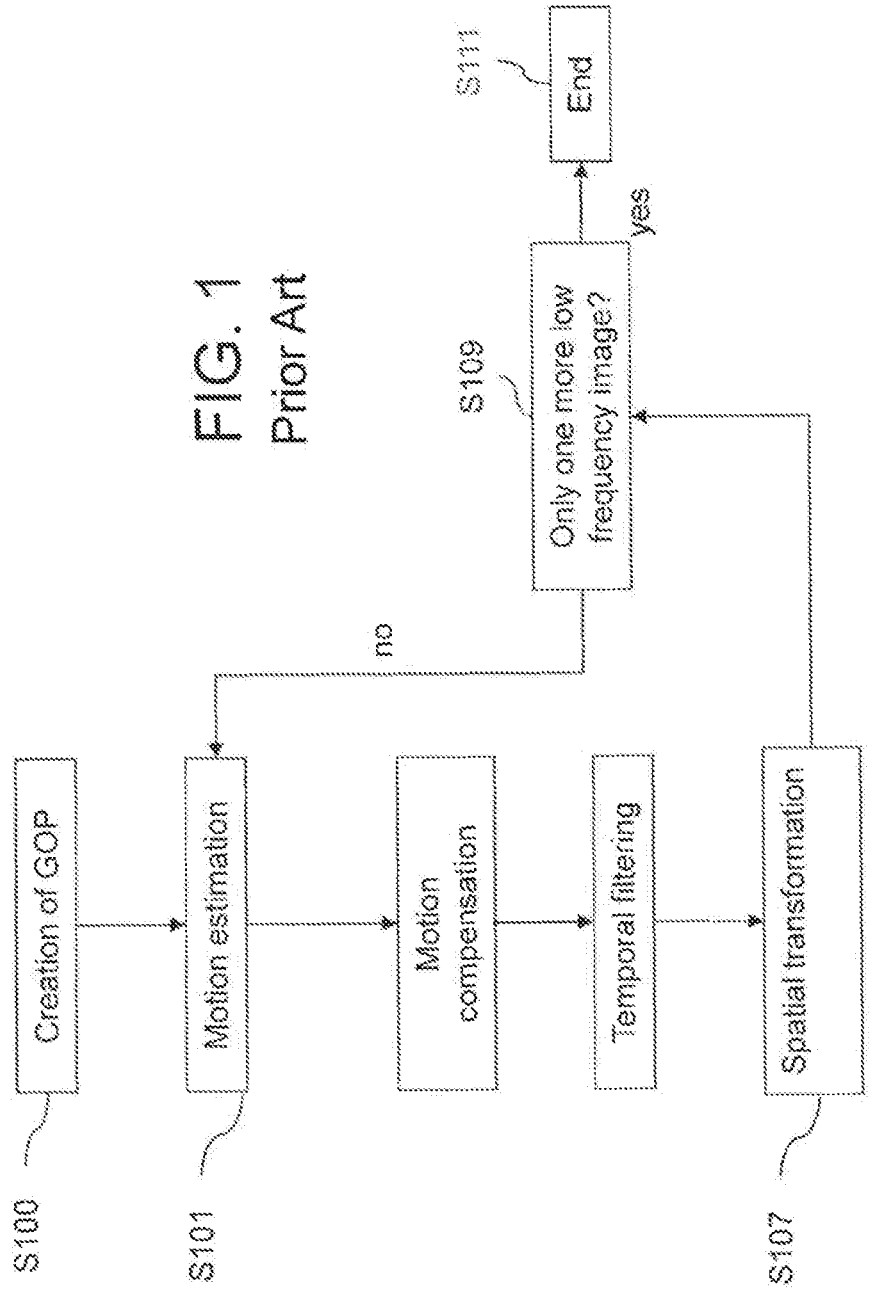
Figure 2:
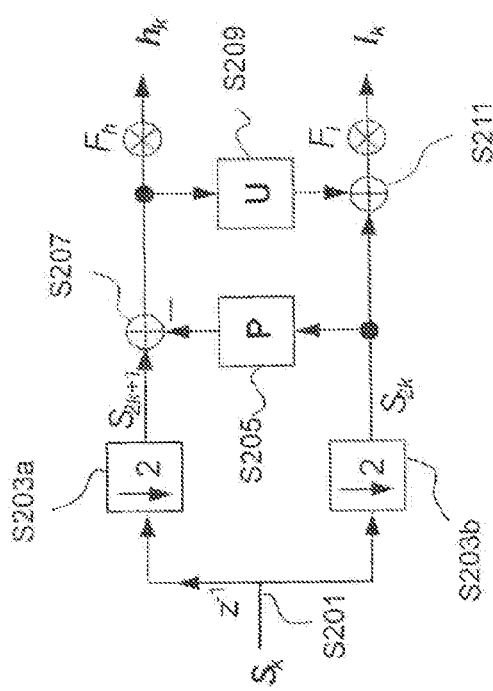
Figure 3:
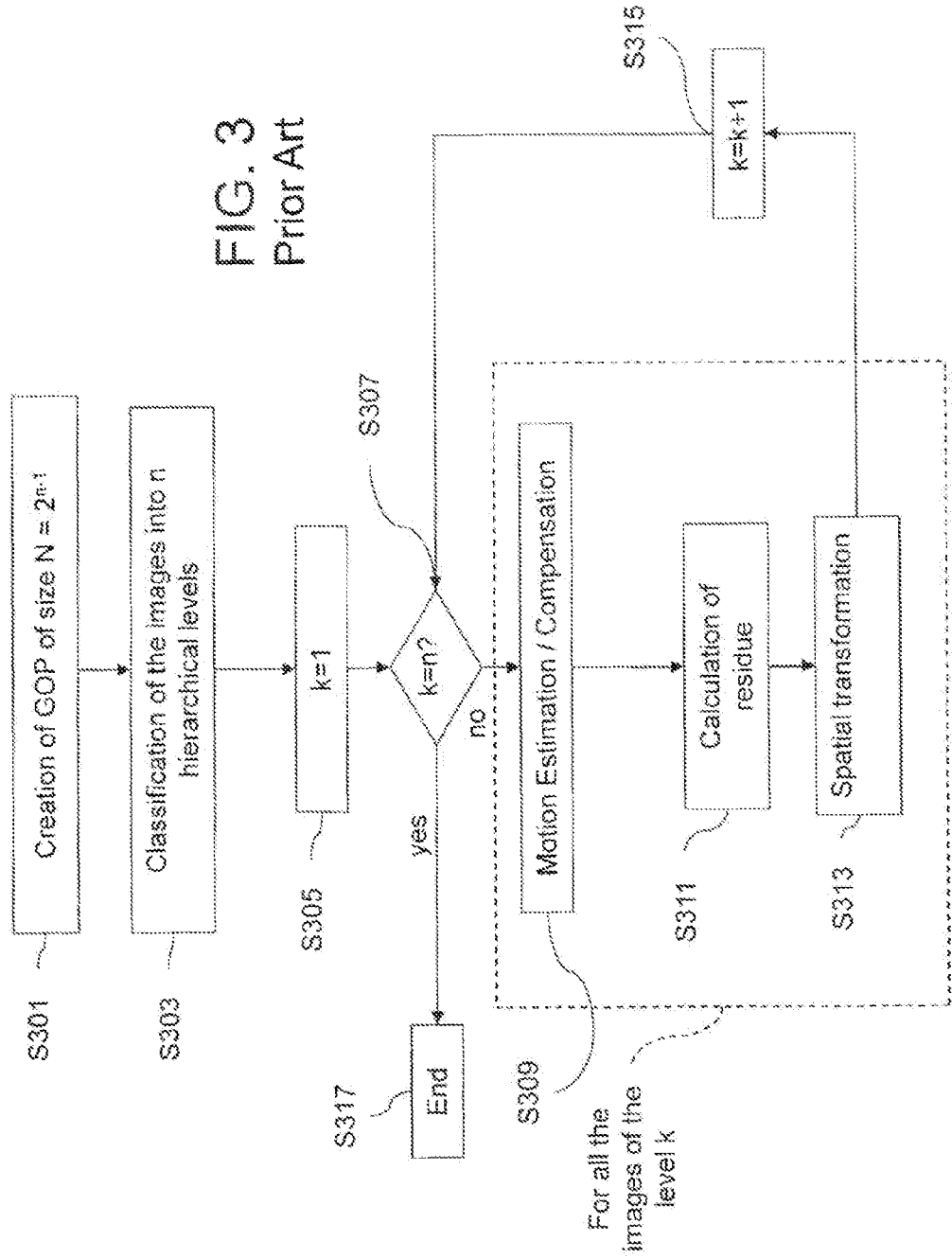
Figure 7:
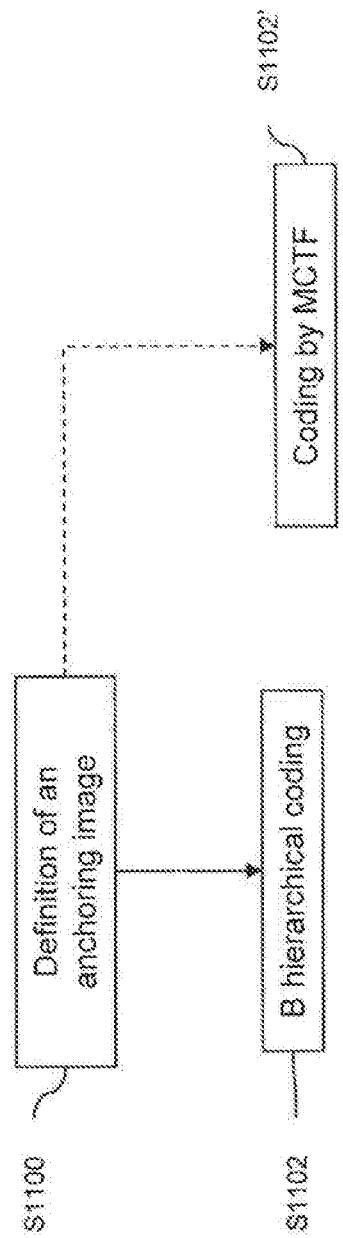
FIG. 7 illustrates an example of implementation of the step of coding the images of the refinement level not having a temporal correspondent in the base level.
Figure 8:
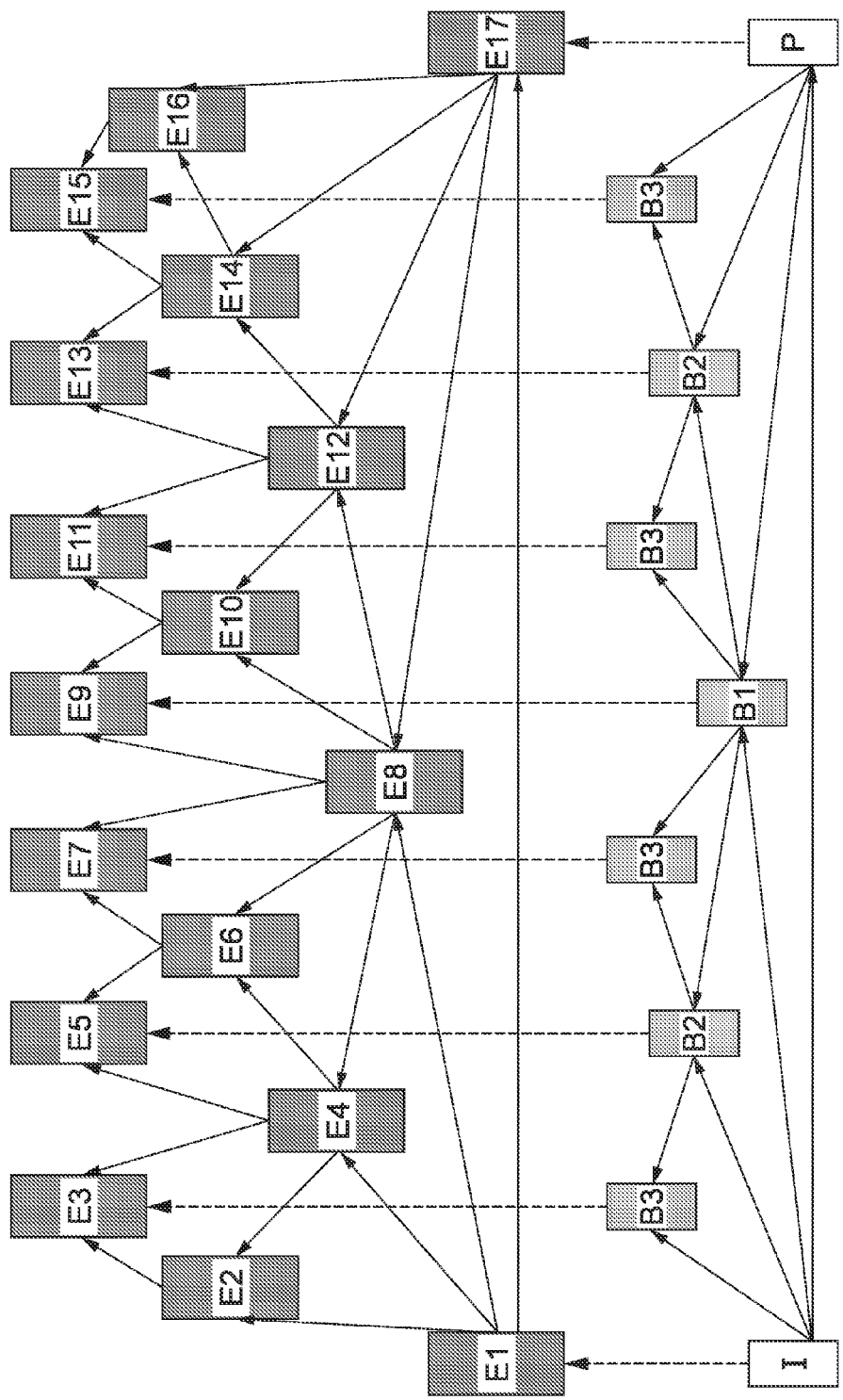
FIG. 8 is a diagrammatic representation of an example of closed-loop coding of a video stream in accordance with the teachings of the invention.

With reference to FIG. 7, the step of selecting the anchoring image S1100 is followed by step S1102 at which the coding of the images not having a correspondent in the base level is carried out. In the case of the B hierarchical coding envisaged in this first example (step S1102), a similar procedure to that described in FIG. 3 is adopted, taking as references only the images with no temporal correspondent in the base level and the end images (that is to say the first and the last image of the previously coded group), as can be seen in FIG. 8.

It will be noted in this respect that, due to the position of the anchoring image (with no temporal correspondence in the base level) with respect to the end images (each having a temporal correspondent in the base level), it is not always possible to equally distribute the images in terms of time at step S303 of classifying the images into several hierarchical levels. Thus, it is possible that an image will not be at equal distance from the two images serving for its prediction. For example, in FIG. 12, image E8 is closer temporally to E1 than to E17.

Due to this, step S311 may possibly (i.e. optionally) be modified as follows:

As a matter of fact it is known that image B is predicted from two images, one preceding it, the other following it. For each macroblock (MB) of the current image B, two predictions are obtained, the first by making reference to the preceding image, the second by making reference to the current image. In order to compensate for possible prediction errors between a macroblock and its prediction, the difference between the predicted macroblock and the original macroblock is calculated. The difference is next coded in the bitstream with the motion information. In the case of a bi-predicted macroblock, two differences A and B are obtained. Conventionally, these two differences are coded conjointly by taking their average R=(A+B)/2.

When a bi-predicted image is not at equal distance from the two images serving for its prediction, as occurs in the case envisaged here, it can be considered that the content of that image will be closest to the image to which it is temporally the closest. In this case it is thus proposed to modify step S311 by taking into account the inter-image temporal distances in the calculation of the residues, that is to say to use the following formula to determine R:

$$R = \frac{(\alpha_{T_1} A + \alpha_{T_2} B)}{\alpha_{T_1} + \alpha_{T_2}}$$

where $\alpha_{T_1}$ and $\alpha_{T_2}$ are respectively the temporal distances between the current image and the preceding reference image and between the current image and the following reference image.

Returning to FIG. 6, step S1010 is followed by step S1012, at which the coding of the images having a correspondent in the base level is carried out. These images are for example coded adaptively using an inter-layer coding as previously described, i.e. by taking the corresponding image in the base level as reference (dashed lines in FIG. 8).

As a variant, intra level coding could be used with bi-predicted macroblocks (continuous lines in FIG. 8), i.e. by taking the neighboring images in the refinement level as references which, as they do not have a correspondent in the base level, were coded at the preceding step. This variant makes it possible to increase the probability of being able to correctly decode the blocks of the refinement level in case of losses in the temporally corresponding base image.

The same coding mode (chosen for example between the two described above) can be used for all the macroblocks, or one coding mode can be applied to certain macroblocks and the other coding mode to the other macroblocks.

It may also be envisaged to take into account the error rate on the channel in order to choose the prediction mode of the refinement level. The proportion of macroblocks using an inter layer prediction may for example be increased in case of increase in the error rate. The inter layer dependencies are thus limited adaptively.

Figure 9:
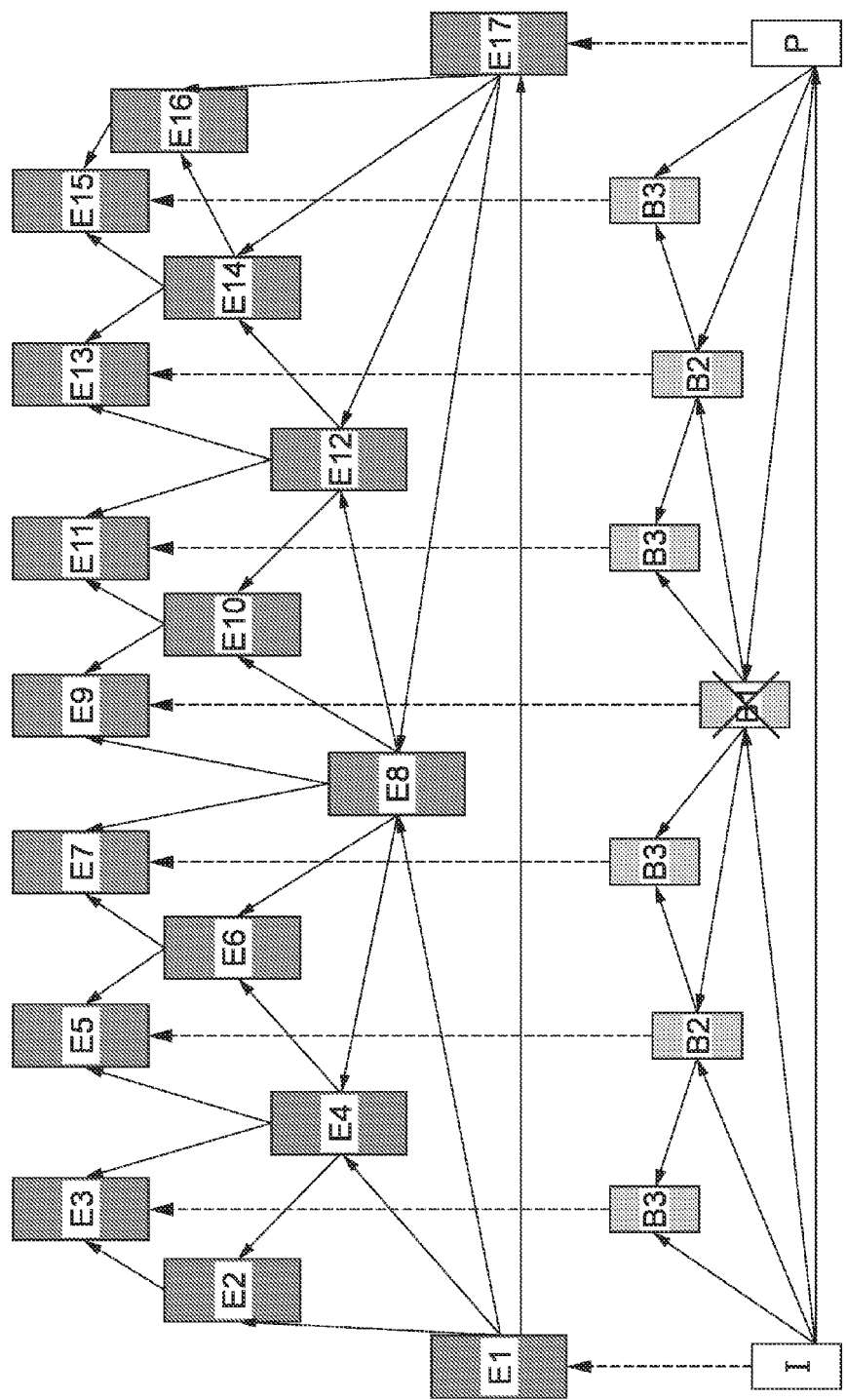
FIGS. 9 and 10 illustrate the limited consequences of the loss of an image of the base level obtained by virtue of the invention.
Figure 10:
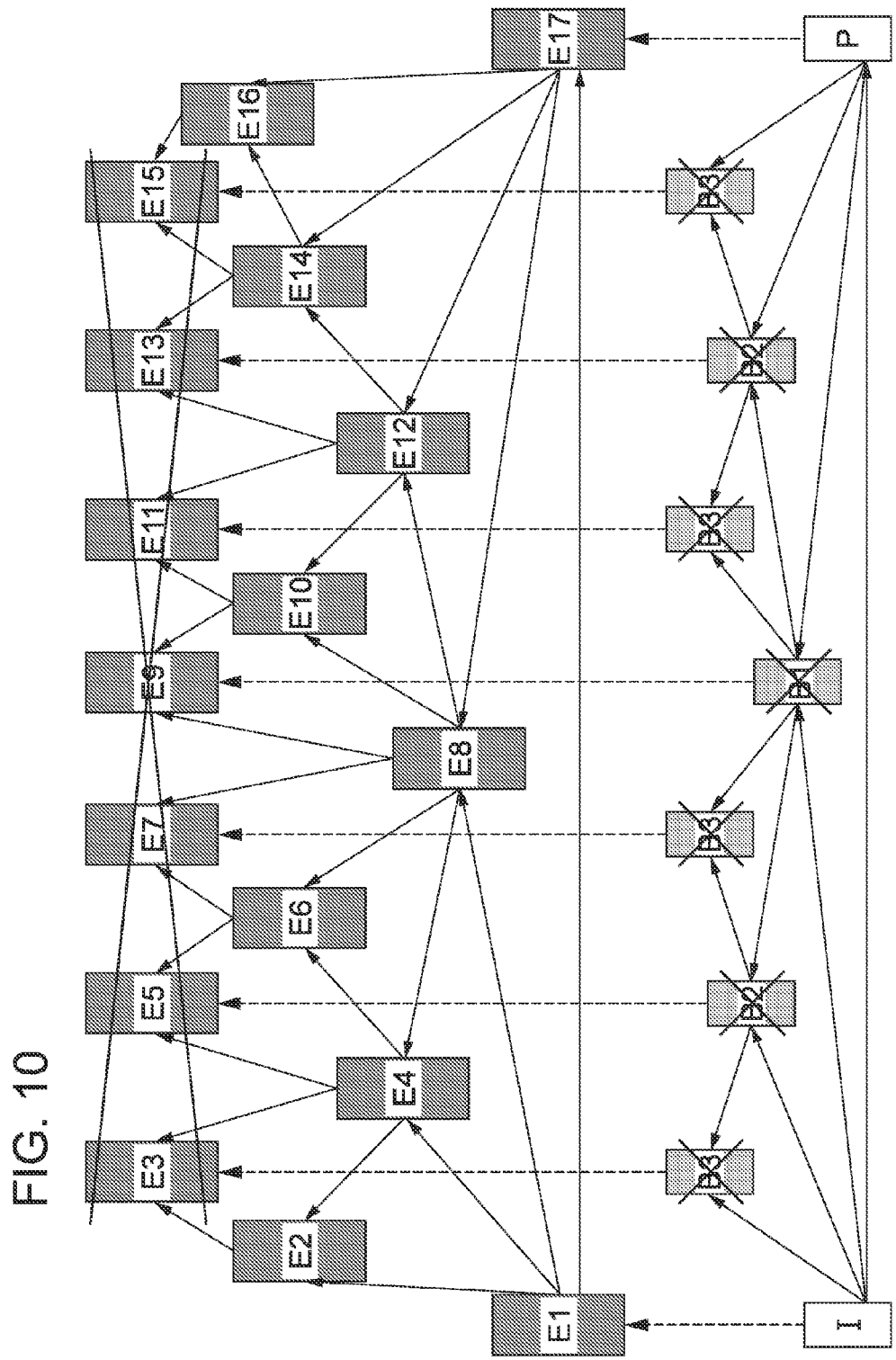

FIG. 8 shows an example of implementation of the invention in the case of closed loop coding (in other words, with B hierarchical images) in the refinement level. In case of losses in the base level, such as the loss of the image B1 as shown in FIG. 9, the propagation of errors is more limited, as represented in FIG. 10 (in the nevertheless unfavorable case in which inter layer coding is used for the images of the refinement level having a correspondent in the base level).

Figure 11:
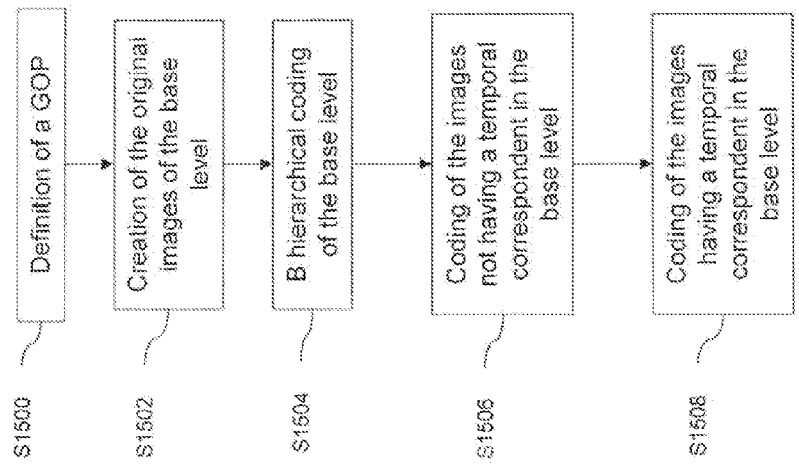
FIG. 11 is a flowchart illustrating the main steps of a method of open-loop coding as provided by the invention.
Figure 12:
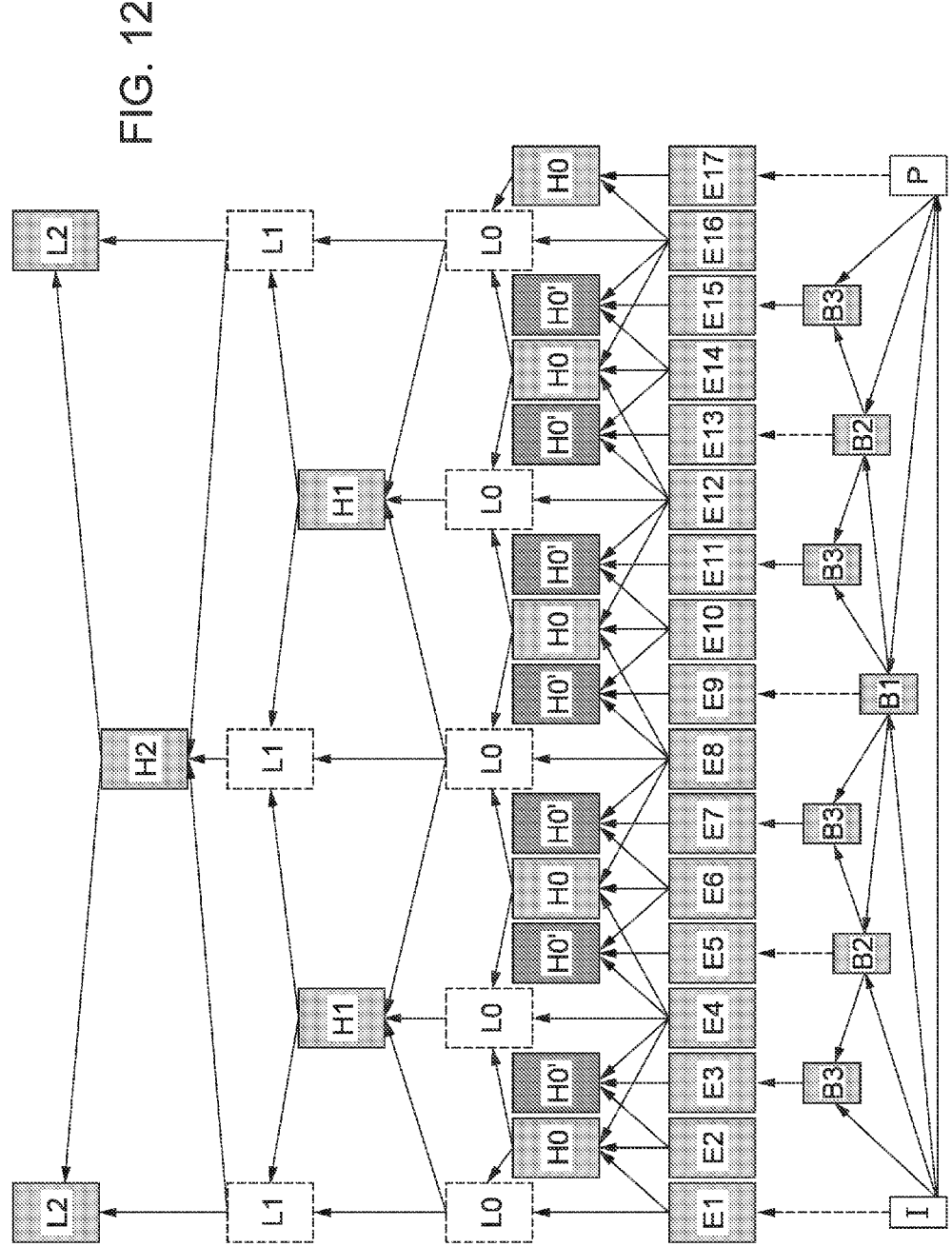
FIG. 12 is a diagrammatic representation of an example of open-loop coding of a video stream in accordance with the teachings of the invention.

FIGS. 11 and 12 illustrate a second example of implementation of the invention in which the coding of the refinement level is performed in open loop by means of motion compensated temporal filtering (MCTF).

Figure 6:
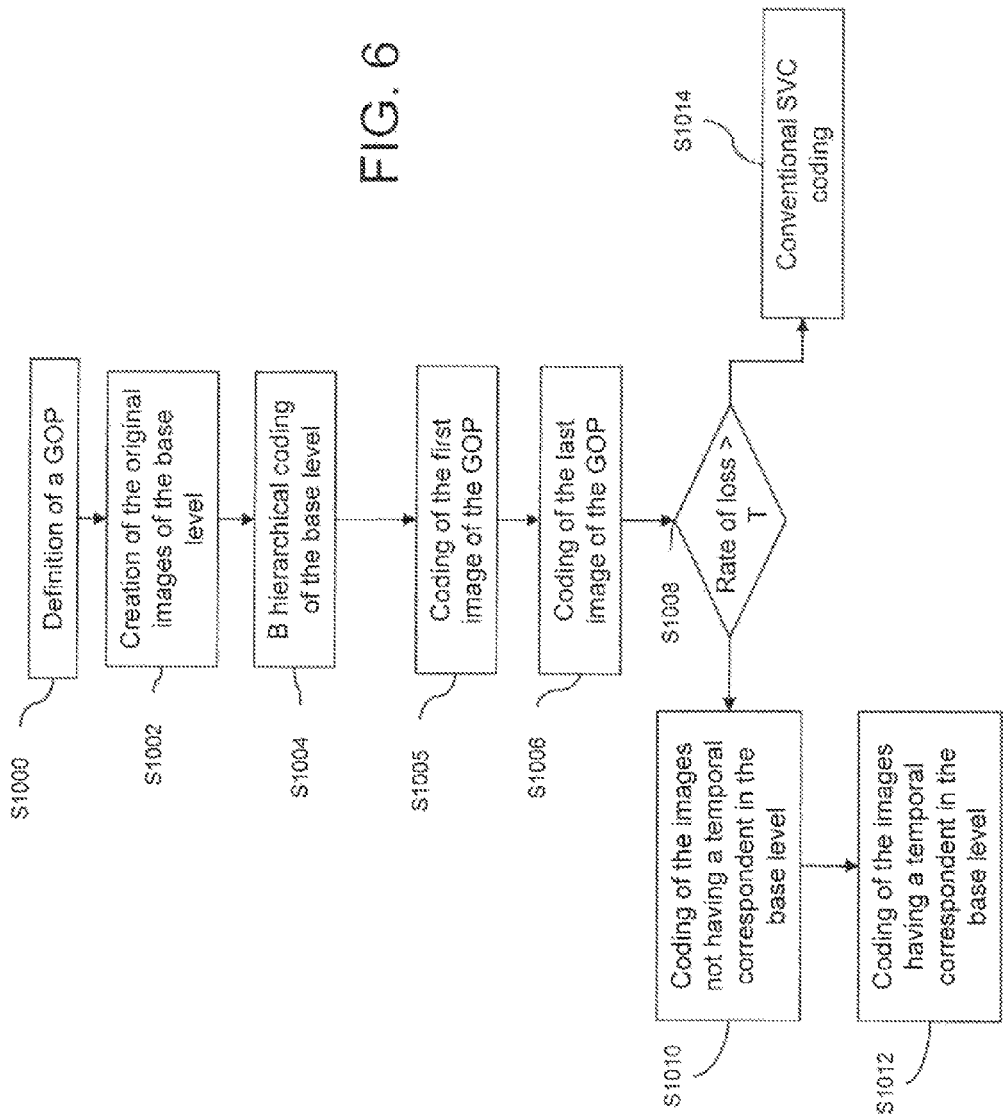
FIG. 6 is a flowchart illustrating the main steps of a method of closed-loop coding as provided by the invention.

The coding commences with steps S1500, S1502 and S1504 which are respectively identical to steps S1000, S1002 and S1004 of FIG. 6.

These steps are followed by step S1506 at which the group of pictures not having a temporal correspondent in the base level is considered and the coding of the images of this group is carried out independently of the bi-predicted images of the base level. As in the first embodiment, reference may however be made to images S1, S17 of the refinement level which correspond temporally to the end images I,P in the base level.

Like step 1010 of FIG. 6, this step can be broken down into two sub-steps presented in FIG. 7. The first sub-step consists of searching for an anchoring image (step S1100 identical to the first embodiment) and is followed by step S1102' at which the coding of the images of the previously defined group is carried out by means of motion compensated temporal filtering (MCTF), in accordance with what has been presented with reference to FIG. 1.

Thus, as represented in FIG. 12, the image E2 of the refinement level will be represented in the video stream by a high frequency image H0 calculated from the images E1, E2, E4, i.e. solely on the basis of images with no temporal correspondent in the base level (here E2 and E4) and possibly an image having a temporal correspondent in the base level (here E1).

Similarly, the image E4 of the refinement level will be represented by an image H1 constructed on the basis of images L0 (calculated but not transmitted in the stream, hence their representation in dashed lines), these images L0 also being determined solely on the basis of images with no temporal correspondent in the base level (here E2, E4 and E6) and possibly of an image having a temporal correspondent in the base level (here E1).

With the same general idea as that which was proposed for the first embodiment, step S105 could be modified to take into account the fact that the images are not equally distributed over the group of pictures considered here (group of pictures with no temporal correspondence in the base level). The equations 2.1 to 2.4 of FIG. 2 will thus be modified by weighting them so as to take into account the inter image temporal distances:

$$h[k]=s[2k+1]-P(s[2k])$$

$$P_{5/3}(s[x,2k])=w_1 \cdot s[x+m_1,2k]+w_2 \cdot s[x+m_2,2k+2]$$

$$l[k]=s[2k]+U(h[k])$$

$$U_{5/3}(h[x,k])=w_3 \cdot h[x+m_1,k]+w_4 \cdot h[x+m_2,k-1]$$

where w1, w2, w3 and w4 are weighting factors taking into account the inter image distances.

With reference to FIG. 11, step S1506 is followed by step S1508 at which the coding of the images having a temporal correspondent in the base level is carried out. As for the first embodiment, these images are coded adaptively, either with reference to the previously coded images of the refinement level (full lines in FIG. 12), by applying here the prediction step by means of the motion compensated temporal filtering (MCTF), or by applying inter layer prediction to them with reference to the corresponding image in the base level (dashed lines in FIG. 12).

It is noted that, as clearly visible in FIG. 12, the images H0' coming from the coding of the images having a temporal correspondent in the base level are not used in the calculation of other images. Thus the dependencies in the refinement level are limited, which is desirable in particular when the image H0' concerned is coded with reference to a bi-predicted image of the base level since in this case the propagation of the errors affecting the base level is limited solely to the image H0' concerned.

Figure 13:
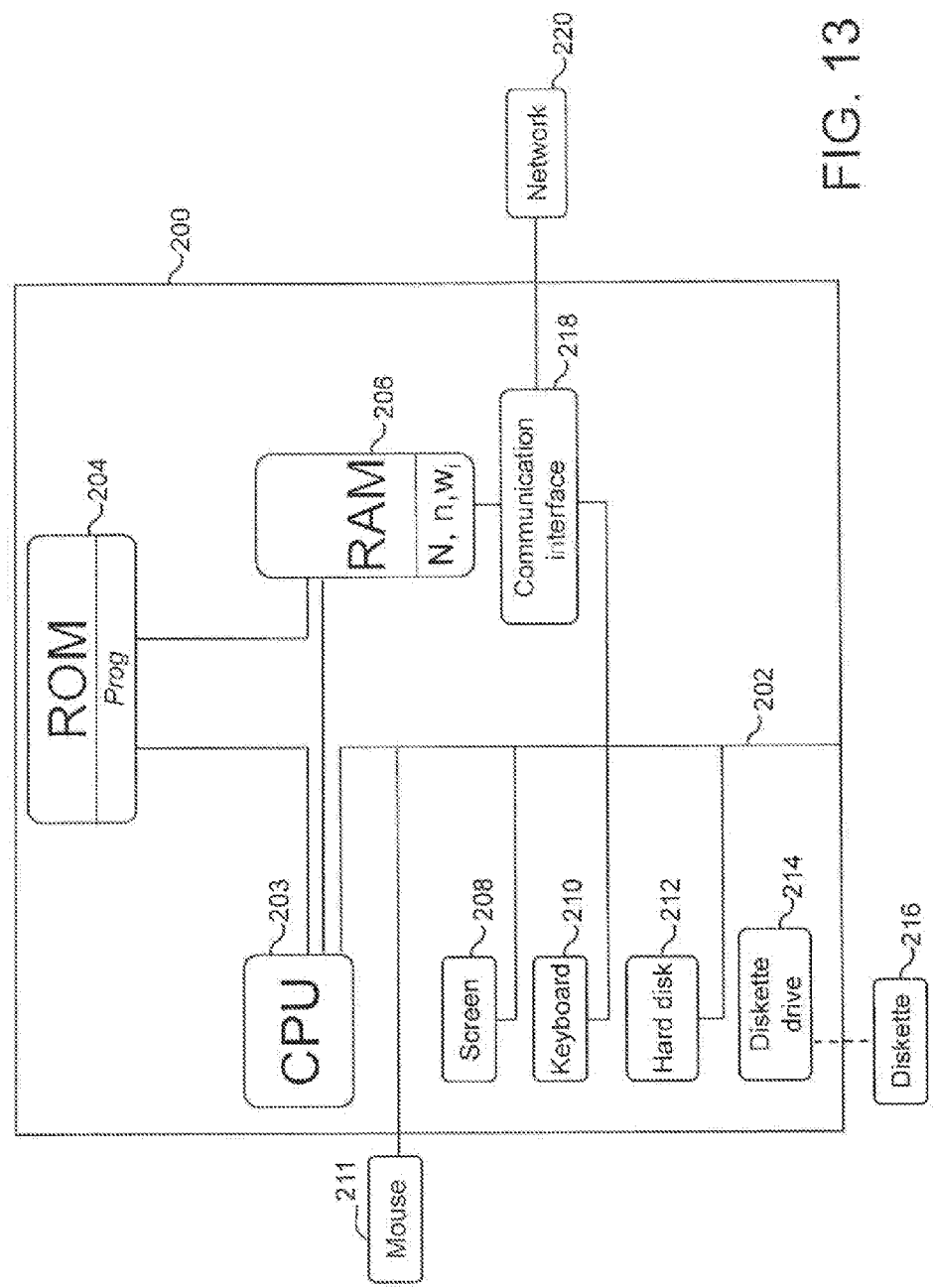
FIG. 13 is a diagrammatic representation of a multimedia unit which may implement the present invention.

A device which may implement the present invention is illustrated in FIG. 13 in the form of a multimedia unit 200.

The multimedia unit may for example be a microcomputer or a workstation. This device is connected to different peripherals such as any means for image storage connected to a graphics card and supplying multimedia data to device 200.

The device 200 comprises a communication bus 202 to which there are connected:
  a calculation unit 203,
  a read only memory 204, able to contain one or several programs "Prog" executing the methods according to the invention,
  a random access memory 206, comprising registers adapted to record variables and parameters created and modified during the execution of the aforementioned programs,
  a display unit such as a screen 208, for viewing data and/or serving as a graphical interface with a network administrator who will be able to interact with the programs according to the invention, using a keyboard 210 or any other means such as a pointing device, for example a mouse 211 or an optical stylus,
  a communication interface 218 connected to a communication network 220, for example the Internet network, the interface being able among others to receive data, in this case, a video stream and in particular, a video stream in SVC format.

The device 200 may also optionally comprise:
  a hard disk 212 able to contain the aforementioned programs "Prog",
  a diskette drive 214 adapted to receive a diskette 216 and to read or write thereon data processed or to be processed according to the present invention.

The communication bus 202 allows communication and interoperability between the different elements included in the device 200 or connected to it. The representation of the bus is non-limiting and, in particular, the calculation unit 203 unit may communicate instructions to any element of the device 200 directly or by means of another element of the device 200.

The executable code of each program enabling the device 200 to implement the methods according to the invention may be stored, for example, on the hard disk 212 or in read only memory 204.

As a variant, the diskette 216 may contain data as well as the executable code of the aforementioned programs which, once read by the device 200, will be stored on the hard disk 212.

In another variant, the executable code of the programs can be received over the communication network 220, via the interface 218, in order to be stored in an identical manner to that described previously.

The diskettes can be replaced by any information carrier such as a compact disc (CD-ROM) or a memory card. Generally, an information storage means, which can be read by a computer or microprocessor, integrated or not into the device 200, and which may possibly be removable, is adapted to store one or several programs whose execution permits the implementation of the method in accordance with the present invention.

More generally, the program or programs may be loaded into one of the storage means of the device 200 before being executed.

The calculation unit 203 controls and directs the execution of the instructions or portions of software code of the program or programs according to the invention, these instructions being stored on the hard disk 212 or in the read only memory 204 or in the other aforementioned storage elements. On powering up, the program or programs which are stored in a non-volatile memory, for example the hard disk 212 or the read only memory 204, are transferred into the random access memory (RAM) 206, which then contains the executable code of the program or programs according to the invention, as well as registers for storing the variables and parameters necessary for implementation of the invention.

The invention claimed is:

1. A method of coding a video sequence in the form of a base level and a refinement level, wherein a group of pictures of the base level comprises intra coded or mono-predicted end images and bi-predicted images, and wherein the refinement level comprises at least one image with no temporal correspondent in the base level, the method comprising:
   predictive coding of said image with no temporal correspondent by making reference to a plurality of images, each image of said plurality of images being an image of the refinement level with no temporal correspondent in the base level or an image of the refinement level corresponding temporally to an end image; and
   determining as an anchoring image an image of the refinement level with no temporal correspondent in the base level and temporally neighboring an image of the base level that is bi-predicted with reference to the end images.

2. The coding method according to claim 1, including a step of coding at least one image of the refinement level temporally corresponding to an image of the base level by making reference to the image of the base level.

3. The coding method according to claim 1 or 2, including a step of coding at least one image of the refinement level temporally corresponding to an image of the base level by making reference to at least one image with no temporal correspondent in the base level.

4. The coding method according to claim 1 or 2, including a step of coding said image of the refinement level temporally corresponding to an end image by making reference to the end image.

5. The coding method according to claim 1, wherein the determining step comprises a step of selecting the image optimizing a rate-distortion criterion from the images of the refinement level with no temporal correspondent in the base level and temporally neighboring the image of the base level bi-predicted with reference to the end images.

6. The coding method according to claim 1, wherein the coding of the images of the refinement level, with no temporal correspondent in the base level and situated temporally between the anchoring image and an end image, is performed on the basis of the anchoring image and the image of the refinement level temporally corresponding to that end image.

7. The coding method according to claim 1 or 2, wherein closed-loop coding is applied to the set formed by the images of the refinement level with no temporal correspondent in the base level and the images of the refinement level corresponding temporally to the end images.

8. The coding method according to claim 7, wherein the temporal prediction of a first image of the refinement level with no temporal correspondent in the base level, by making reference to a second image of the refinement level with no temporal correspondent in the base level and to an image of the refinement level corresponding temporally to an end image, comprises a step of calculating a weighted average of two differences calculated with respect to the two reference images used, the weighting taking into account temporal distances between the images.

9. The coding method according to claim 1 or 2, wherein open-loop coding using motion compensated temporal filtering is applied to the set formed by the images of the refinement level with no temporal correspondent in the base level and the images of the refinement level corresponding temporally to the end images.

10. The coding method according to claim 9, wherein the temporal filtering with reference to an image of the refinement level with no temporal correspondent in the base level and to an image of the refinement level corresponding temporally to an end image is weighted by temporal distances separating the images.

11. A method of transmitting a video sequence over a transmission channel, comprising:
    estimating losses over the transmission channel;
    coding the video sequence using the coding method according to claim 1, in which a coding mode of a macroblock of an image having a temporal correspondent in the base level is determined according to the estimated losses;
    sending the coded sequence.

12. A method of decoding a video sequence received in the form of a base level and a refinement level, a group of pictures of the base level comprising intra coded or mono-predicted end images and bi-predicted images, the refinement level comprising at least one image with no temporal correspondent in the base level, said method comprising:
    predictive decoding of said image with no temporal correspondent by making reference to a plurality of images, each image of said plurality being an image of the refinement level with no temporal correspondent in the base level or an image of the refinement level corresponding temporally to an end image,
    wherein the decoding of the images of the refinement level, with no temporal correspondent in the base level and situated temporally between an anchoring image and the end image, is performed on the basis of the anchoring image and the image of the refinement level temporally corresponding to that end image, the anchoring image being an image of the refinement level with no temporal correspondent in the base level and temporally neighboring an image of the base level that is bi-predicted with reference to the end images.

13. A non-transitory partially or totally removable information storage means which can be read by a computer or a microprocessor storing instructions of a computer program, characterized in that it makes it possible to implement the method according to any one of claims 1, 2, and 11-12.

14. A computer program product which is stored into a non-transitory programmable apparatus, characterized in that it comprises sequences of instructions for implementing the method according to any one of claims 1, 2, and 11-12, when that program is loaded and executed by the programmable apparatus.

15. A non-transitory information storage means which can be read by a computer or a microprocessor storing instructions of a computer program, characterized in that it makes it possible to implement the method according to any one of claims 1, 2, and 11-12.

16. The decoding method according to claim 12, wherein closed-loop decoding is applied to the set formed by the images of the refinement level with no temporal correspondent in the base level and the images of the refinement level corresponding temporally to the end images.

17. The decoding method according to claim 16, wherein the temporal prediction of a first image of the refinement level with no temporal correspondent in the base level, by making reference to a second image of the refinement level with no temporal correspondent in the base level and to an image of the refinement level corresponding temporally to an end image, comprises a step of using a weighted average of two differences calculated with respect to the two reference images used, the weighting taking into account temporal distances between the images.

18. The decoding method according to claim 12, wherein open-loop decoding using motion compensated temporal filtering is applied to the set formed by the images of the refinement level with no temporal correspondent in the base level and the images of the refinement level corresponding temporally to the end images.

19. The decoding method according to claim 18, wherein the temporal filtering with reference to an image of the refinement level with no temporal correspondent in the base level and to an image of the refinement level corresponding temporally to an end image is weighted by temporal distances separating the images.

20. A device for coding a video sequence in the form of a base level and an refinement level, a group of pictures of the base level comprising intra coded or mono-predicted end images and bi-predicted images, the refinement level comprising at least one image with no temporal correspondent in the base level, said device comprising:
   means for predictive coding of said image with no temporal correspondent by making reference to a plurality of images configured such that each image of said plurality is an image of the refinement level with no temporal correspondent in the base level or an image of the refinement level corresponding temporally to an end image; and
   means for determining as an anchoring image an image of the refinement level with no temporal correspondent in the base level and temporally neighboring an image of the base level that is bi-predicted with reference to the end images.

21. The coding device according to claim 20, including means for selecting the image optimizing a rate-distortion criterion from the images of the refinement level with no temporal correspondent in the base level and temporally neighboring the image of the base level bi-predicted with reference to the end images.

22. The coding device according to claim 20 or 21, including means for closed-loop coding of the set formed by the images of the refinement level with no temporal correspondent in the base level and the images of the refinement level corresponding temporally to the end images.

23. The coding device according to claim 22, wherein means for temporal prediction of a first image of the refinement level with no temporal correspondent in the base level, by making reference to a second image of the refinement level with no temporal correspondent in the base level and to an image of the refinement level corresponding temporally to an end image, comprise means for calculating a weighted average of two differences calculated with respect to the two reference images used, the weighting taking into account temporal distances between the images.

24. The coding device according to claim 20 or 21, including means for open-loop coding using motion compensated temporal filtering of the set formed by the images of the refinement level with no temporal correspondent in the base level and the images of the refinement level corresponding temporally to the end images.

25. The coding device according to claim 24, wherein the means for temporal filtering with reference to an image of the refinement level with no temporal correspondent in the base level and to an image of the refinement level corresponding temporally to an end image comprise means for weighting by the temporal distances separating the images.

26. A device for transmitting a video sequence over a transmission channel, characterized in that it comprises:
   means for estimating losses over the transmission channel;
   the device for coding the video sequence according to claim 20, with means for determining a coding mode of a macroblock of an image having a temporal correspondent in the base level according to the estimated losses; and
   means for sending the coded sequence.

27. A device for decoding a video sequence received in the form of a base level and an refinement level, a group of pictures of the base level comprising intra coded or mono-predicted end images and bi-predicted images, the refinement level comprising at least one image with no temporal correspondent in the base level, said device comprising:
   means for predictive decoding of said image with no temporal correspondent by making reference to a plurality of images configured such that each image of said plurality is an image of the refinement level with no temporal correspondent in the base level or an image of the refinement level corresponding temporally to an end image,
   wherein the decoding of the images of the refinement level, with no temporal correspondent in the base level and situated temporally between an anchoring image and the end image, is performed on the basis of the anchoring image and the image of the refinement level temporally corresponding to that end image, the anchoring image being an image of the refinement level with no temporal correspondent in the base level and temporally neighboring an image of the base level that is bi-predicted with reference to the end images.

28. A non-transitory computer-readable medium storing a data stream representing a video sequence in the form of a base level and an refinement level, a group of pictures of the base level comprising intra coded or mono-predicted end images and bi-predicted images, the refinement level comprising at least one image with no temporal correspondent in the base level,
   wherein said image with no temporal correspondent is predictively coded by making reference to a plurality of images, each image of said plurality being an image of the refinement level, with no temporal correspondent in the base level and temporally neighboring an image of the base level that is bi-predicted with reference to the end image, is determined as an anchoring image.

29. A method of coding a video sequence in the form of a base level and a refinement level, a group of pictures of the base level comprising intra coded or mono-predicted end images and bi-predicted images, the refinement level comprising at least one B-hierarchical image with no temporal correspondent in the base level, said method comprising:

predictive coding of said B-hierarchical image with no temporal correspondent by making reference to at least one image of the refinement level with no temporal correspondent in the base level; and determining as an anchoring image an image of the refinement level with no temporal correspondent in the base level and temporally neighboring an image of the base level that is bi-predicted with reference to the end images.

30. The coding method according to claim 29, wherein said B-hierarchical image is coded by making reference to said at least one image and to another image of the refinement level with no temporal correspondent in the base level.

31. A method of decoding a video sequence received in the form of a base level and an refinement level, a group of pictures of the base level comprising intra coded or mono-predicted end images and bi-predicted images, the refinement level comprising at least one B-hierarchical image with no temporal correspondent in the base level, said method comprising:

predictive decoding of said B-hierarchical image with no temporal correspondent by making reference to at least one image of the refinement level with no temporal correspondent in the base level, wherein the decoding of the images of the refinement level, with no temporal correspondent in the base level and situated temporally between an anchoring image and the end image, is performed on the basis of the anchoring image and the image of the refinement level temporally corresponding to that end image, the anchoring image being an image of the refinement level with no temporal correspondent in the base level and temporally neighboring an image of the base level that is bi-predicted with reference to the end images.

32. The decoding method according to claim 31, wherein said B-hierarchical image is decoded with reference to said at least one image and to another image of the refinement level with no temporal correspondent in the base layer.

33. A device for coding a video sequence in the form of a base level and an refinement level, a group of pictures of the base level comprising intra coded or mono-predicted end images and bi-predicted images, the refinement level comprising at least one B-hierarchical image with no temporal correspondent in the base level, said device comprising:

means for predictive coding of said B-hierarchical image with no temporal correspondent by making reference to at least one an image of the refinement level with no temporal correspondent in the base level; and means for determining as an anchoring image an image of the refinement level with no temporal correspondent in the base level and temporally neighboring an image of the base level that is bi-predicted with reference to the end images.

34. A device for decoding a video sequence received in the form of a base level and an refinement level, a group of pictures of the base level comprising intra coded or mono-predicted end images and bi-predicted images, the refinement level comprising at least one B-hierarchical image with no temporal correspondent in the base level, said device comprising:

means for predictive decoding of said B-hierarchical image with no temporal correspondent by making reference to at least one image of the refinement level with no temporal correspondent in the base level, wherein the decoding of the images of the refinement level, with no temporal correspondent in the base level and situated temporally between an anchoring image and the end image, is performed on the basis of the anchoring image and the image of the refinement level temporally corresponding to that end image, the anchoring image being an image of the refinement level with no temporal correspondent in the base level and temporally neighboring an image of the base level that is bi-predicted with reference to the end images.

35. A non-transitory computer-readable medium storing a data stream representing a video sequence in the form of a base level and an refinement level, a group of pictures of the base level comprising intra coded or mono-predicted end images and bi-predicted images, the refinement level comprising at least one B-hierarchical image with no temporal correspondent in the base level, wherein said B-hierarchical image with no temporal correspondent is predictively coded by making reference to at least one image of the refinement level, with no temporal correspondent in the base level and temporally neighboring an image of the base level that is bi-predicted with reference to the end image, is determined as an anchoring image.

36. The non-transitory computer-readable medium storing a data stream according to claim 35, wherein said B-hierarchical image is predictively coded by making reference to said at least one image and to another image of the refinement level with on temporal correspondent in the base level.

* * * * *